(12) United States Patent
Gent et al.

(10) Patent No.: US 6,536,640 B1
(45) Date of Patent: Mar. 25, 2003

(54) TOTE ALL

(76) Inventors: Gloria J. Gent, 1667 Pratt St., Deland, FL (US) 32720; Kim D. Kresta, 1667 Pratt St., Deland, FL (US) 32720

(*) Notice: Subject to any disclaimer, the term of this patent is extended or adjusted under 35 U.S.C. 154(b) by 0 days.

(21) Appl. No.: 09/879,920

(22) Filed: Jun. 14, 2001

Related U.S. Application Data

(60) Provisional application No. 60/223,575, filed on Aug. 7, 2000.

(51) Int. Cl.[7] .................................................. B60R 7/00
(52) U.S. Cl. ........................ 224/403; 224/500; 224/551
(58) Field of Search ................................ 224/403, 500, 224/501, 550, 551, 42.13, 542

(56) References Cited

U.S. PATENT DOCUMENTS

| | | | | |
|---|---|---|---|---|
| 1,482,770 A | * | 2/1924 | Terrell ......................... 224/497 |
| 2,204,824 A | * | 6/1940 | Rock ........................... 224/499 |
| 2,720,414 A | * | 10/1955 | Hart ............................. 211/182 |
| 4,684,087 A | * | 8/1987 | Spickard ..................... 224/539 |
| 4,915,276 A | * | 4/1990 | Devito ........................ 224/500 |
| 5,041,050 A | | 8/1991 | Frazier et al. |
| 5,520,314 A | | 5/1996 | Tkachuk |
| 5,988,722 A | * | 11/1999 | Parri ........................... 224/403 |
| 6,027,000 A | * | 2/2000 | Sterzel et al. ............... 211/182 |
| 6,041,987 A | * | 3/2000 | Tickoo ........................... 220/8 |
| 6,138,883 A | | 10/2000 | Jackson et al. |
| 6,164,607 A | * | 12/2000 | Hawkes ...................... 141/391 |
| 6,347,731 B1 | * | 2/2002 | Burger ........................ 224/402 |

* cited by examiner

*Primary Examiner*—Stephen K. Cronin
(74) *Attorney, Agent, or Firm*—Patent & Trademark Services; Joseph H. McGlynn

(57) ABSTRACT

A device that can be put between the wheel wells in the bed of any pickup truck. The device features a plurality of adjustable tubular molded pieces in the shape of a rectangle to allow pickup truck owners to carry cargo within the bed. Additionally, incorporated with the device is an attachment having a cuff at each end and being adjustable in length.

8 Claims, 2 Drawing Sheets

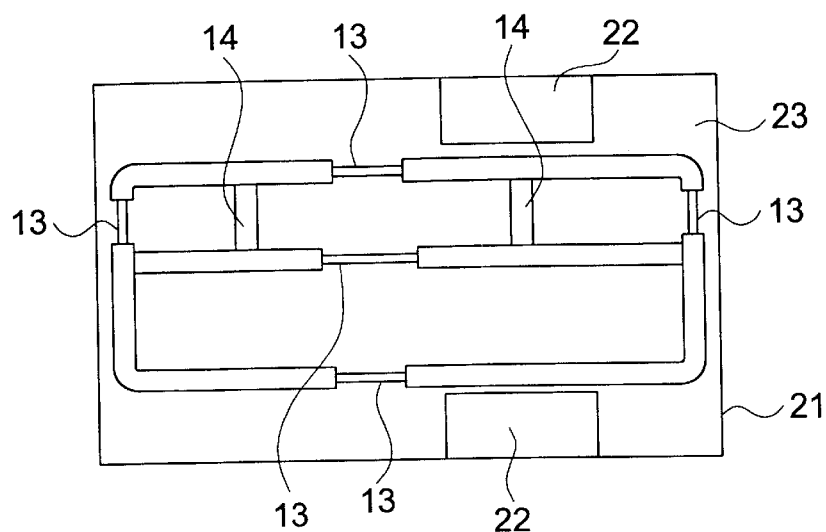
FIG.2
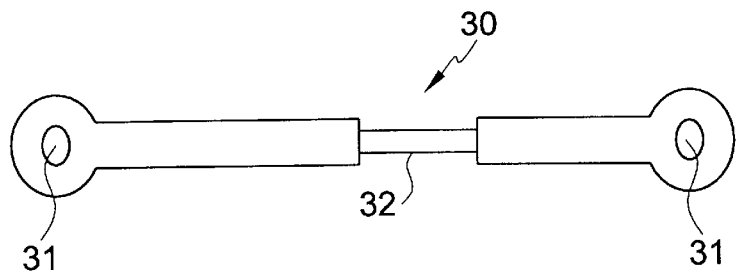
FIG.3
FIG.4
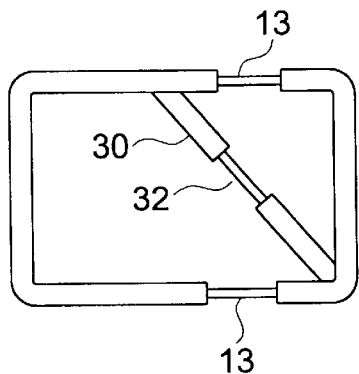
FIG.5
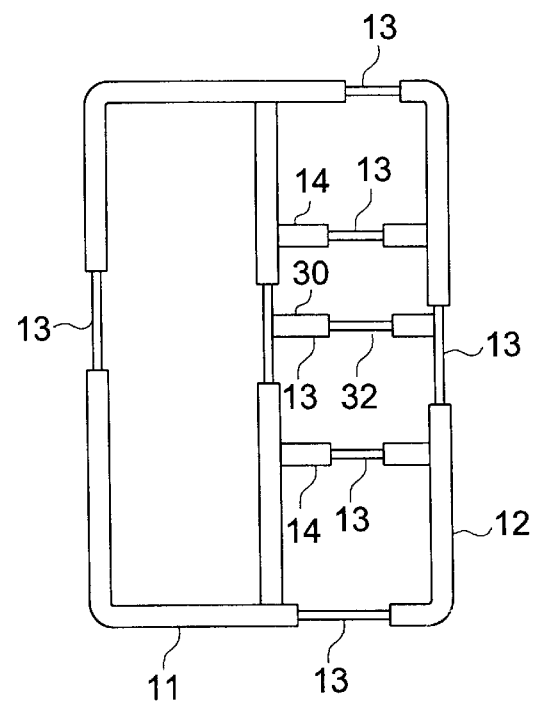

TOTE ALL

Applicant claims the priority of Provisional application Ser. No. 60/223,575, filed Aug. 7, 2000.

BACKGROUND OF THE INVENTION

This invention relates, in general, to cargo carriers, and, in particular, to cargo carriers for motor vehicles and trailers.

DESCRIPTION OF THE PRIOR ART

In the prior art various types of cargo carriers have been proposed. For example, Hart (U.S. Pat. No. 2,720,414) describes a cargo carrier for the back of a pickup truck that has a plurality of bars connected together by a spring biased locking system. However, one problem with the invention of Hart is that the cargo carrier may obstruct the driver's view.

Tkachuk (U.S. Pat. No. 5,520,314) describes a truck bed diver which is a one-piece structure made from a plurality of bars to hold cargo.

Jackson et al. (U.S. Pat. No. 6,138,883) describes a partition system for the bed of a pickup with end pieces and interlocking dividing pieces that connect to the end pieces.

Frazier et al. (U.S. Pat. No. 5,526,972) describes a storage compartment for a pickup having a backboard and wings extending from the backboard and a stabilizer between the wings.

SUMMARY OF THE INVENTION

The present invention is directed to a cargo carrier for either a motorized, or non-motorized, vehicle or trailer that has a plurality of bars connected together so that at least one of the bars can be adjusted by a spring based locking system. Furthermore, adjustable sliding cuff cross bars may be attached to said bars so as to adjust the cross bars to provide different sized areas.

It is an object of the present invention to provide a new and improved cargo carrier for either a motorized, or non-motorized, vehicle or trailer.

It is an object of the present invention to provide a new and improved cargo carrier for either a motorized, or non-motorized, vehicle or trailer, which is adjustable to fit any sized cargo compartment.

It is an object of the present invention to provide a new and improved cargo carrier for either a motorized, or non-motorized, vehicle or trailer thereby allowing the transport of goods without those goods sliding around or being ejected from either the vehicle or trailer.

It is an object of the present invention to provide a new and improved cargo carrier for either a motorized, or non-motorized, vehicle or trailer that can be separated into individual compartments.

It is a further object of the present invention to provide a new and improved cargo carrier for either a motorized, or non-motorized, vehicle or trailer that can be produced in different colors and/or with different patterns to suit a wide variety of consumer tastes.

It is a further object of the present invention to provide a new and improved cargo carrier for either a motorized, or non-motorized, vehicle or trailer that will not obstruct the driver's view.

These and other objects and advantages of the present invention will be fully apparent from the following description, when taken in connection with the annexed drawings.

BRIEF DESCRIPTION OF THE DRAWINGS

FIG. 2 is a view of the present invention inside the bed of a pickup truck.

FIG. 3 is a view of an item associated with the present invention.

FIG. 4 shows the item used by the present invention.

FIG. 5 shows a top view of the present invention.

DESCRIPTION OF THE PREFERRED EMBODIMENT

Figure 1:
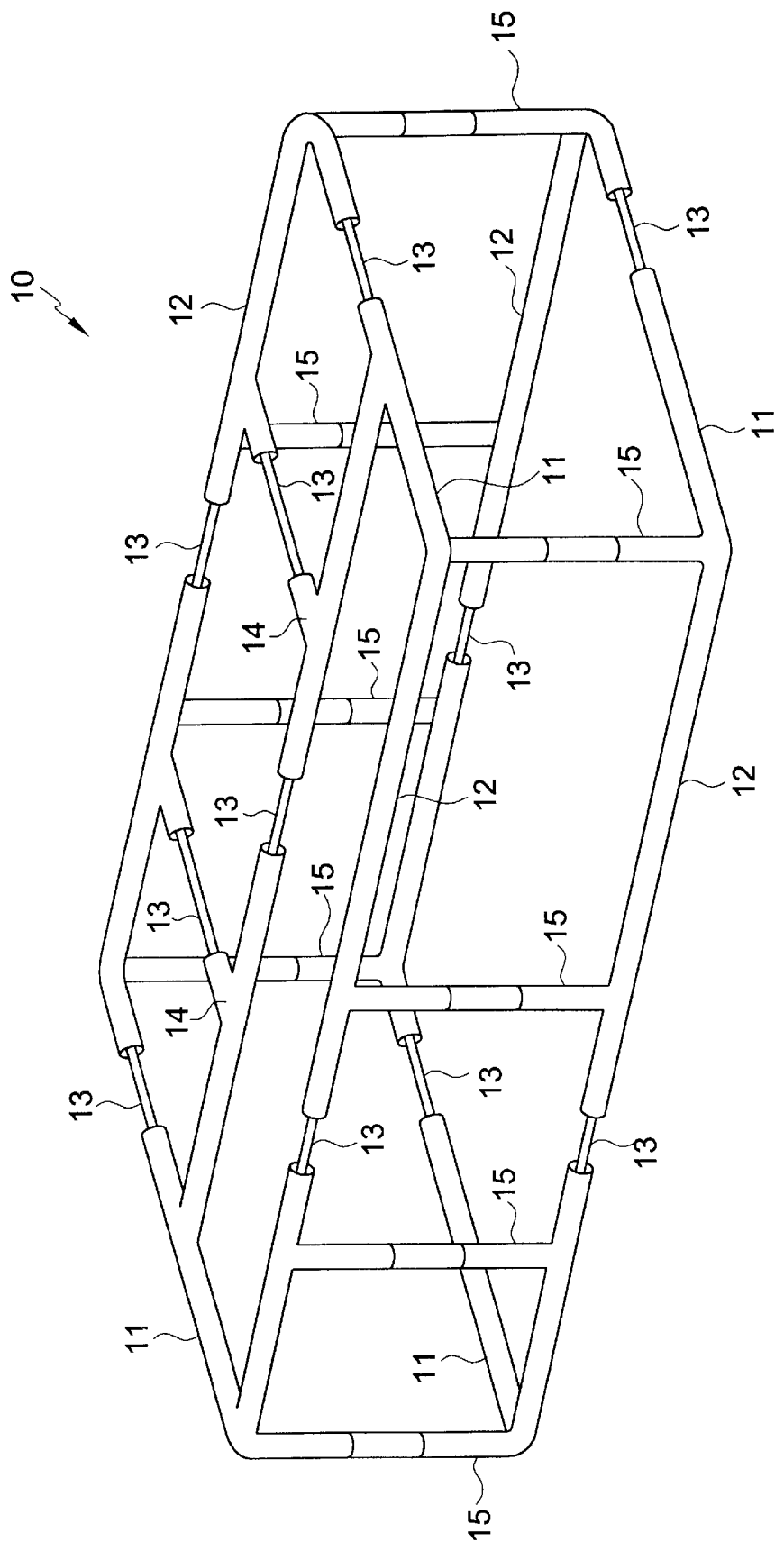
FIG. 1 is a perspective view of the present invention.

Referring now to the drawings in greater detail, FIG. 1 shows a perspective view of the present invention 10.

The present invention 10 features a rectangular framework of tubular molded plastic pieces of various lengths. While the present invention is described as comprising "tubular molded plastic pieces", one skilled in the art would appreciate that the present invention may be manufactured with materials such as, but not limited to, aluminum, polymers, polycarbonates, or the like. Additionally, one skilled in the art would recognize that the tubular molded plastic pieces may be of different shapes, such as a triangle or the like. While the present invention 10, is described as being rectangular in shape, an artisan would appreciate that the present invention can be of any shape.

While it is described that the present invention is placed within the bed of a pick-up truck, the present invention may fit within the trunk of a car, trailer, or any motorized or non-motorized means to transport items. The present invention 10 incorporates four transverse elements 11 running perpendicular to the length of the bed and four parallel elements 12 running parallel to the length of the bed, where both the parallel elements 12 and transverse elements 11 would incorporate a means to adjust their length. In a preferred embodiment of the present invention, the parallel elements 12 and transverse elements 11 incorporate an adjustment mechanism 13, such as a spring-loaded locking unit, however an artisan would appreciate that any other means known within the art may be implemented to adjust the parallel elements 12 and the transverse elements 11. Since both the transverse elements 11 and parallel elements 12 are fully adjustable, the present invention 10 may fit in any space allotted, such as the bed of a pick-up truck, trunk of a car, trailer, or any motorized or non-motorized means to transport cargo.

For the purposes of illustration, the invention also incorporates two crossbeam separator units 14 located between the top two parallel elements 12. The crossbeam separator units 14 would have a cuff, allowing them to be mobile and their position to be adjusted. Additionally, the present invention incorporates six support members 15. While not shown, the support members may be fully adjustable utilizing an adjustment mechanism, such as a spring-loaded locking system or the like, so that the height of the present invention 10 may be adjusted to various heights.

FIG. 2 shows the present invention 10 inside the bed of pickup truck 23. This conventional pickup truck bed 23 has a wheel well 22, and tailgate 21. In a conventional truck bed, the user places an item in the bed of the truck. However, when the truck is in motion, the user runs the risk of those items sliding around the bed of the truck or, on some occasions, flying out. Therefore, a user who places the present invention in the bed of a pickup truck 23 ensures that the items will not be sliding around or lost.

When the user places the present invention within a conventional pick-up truck bed 23, the present invention fits between the wheel wells 22. In an alternative embodiment, since all pickup truck beds are not the same height, the support member 15 may be adjustable utilizing a spring-loaded locking unit in order to adjust the height of the present invention, however an artisan would appreciate that any other means known within the art may be implemented to adjust the support member 15.

In yet another alternative embodiment, a combination of: the transverse elements 11, the parallel elements 12, the cross beam separator units 14, and the support members 15 might have holes in order to properly fasten items being carried within the present invention.

FIG. 3 shows an item that may be included with the present invention. This attachment 30, has a cuff at either end 31 and is adjustable by utilizing a spring-loaded locking system 32, or the like. Since the attachment is fully adjustable, it can be attached to the bottom side of the present invention 10 for use when it would be inverted for use with larger items.

FIGS. 4 and 5 show how the attachment 30 is incorporated with the present invention in both top and side views. Since the present invention has an adjustment means 13, the user connects the attachment 30 to the adjustment means 13. Since the attachment 30, is fully adjustable like the present invention 10, the adjustment means can fit in any vehicle the user desires.

Although the tote all and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

We claim:

1. A device adapted to be placed in a vehicle for carrying items, said device comprising:
   a plurality of vertical supports,
   a plurality of horizontal supports connected to a top of said vertical supports, and
   a plurality of horizontal supports connected to a bottom of said vertical supports,
   means for interconnecting a plurality of said horizontal supports to each other,
   said means being adjustable to allow a distance between said horizontal supports to be adjusted,
   an intermediate support,
   said intermediate support having a first end and a second end,
   said first end being connected to one of said plurality of horizontal supports, and
   said second end being connected to another of said plurality of horizontal supports, and
   wherein there are eight horizontal supports which are joined together to form an open box, and
   wherein four of said horizontal supports have connecting means for receiving said intermediate support.

2. The device as claimed in claim 1, wherein each of said horizontal supports have a first leg and a second leg,
   said first and second legs being joined at a substantially 90° angle.

3. The device as claimed in claim 1, wherein said intermediate support has means for allowing said intermediate support to be adjustable with respect to said horizontal supports.

4. A device adapted to be placed in a vehicle for carrying items, said device comprising:
   a plurality of vertical supports,
   a plurality of horizontal supports connected to a top of said vertical supports, and
   a plurality of horizontal supports connected to a bottom of said vertical supports,
   means for interconnecting a plurality of said horizontal supports to each other,
   said means being adjustable to allow a distance between said horizontal supports to be adjusted,
   an intermediate support,
   said intermediate support comprising at least a first and second member,
   said first member having a first end and a second end,
   said second member having a first end and a second end,
   said first end of said first member being connected to one of said plurality of horizontal supports, and
   said second end of said first member being connected to said first end of said second member, and
   said second end of said second member being connected to a second one of said plurality of horizontal supports, and
   said first member having a connection member located between said first end and said second end of said first member, and
   said second member having a connection member located between said first end and said second end of said second member, and
   said connection member on said first member being connected to a third one of said plurality of horizontal supports, and
   said connection member on said second member being connected to a fourth one of said plurality of horizontal supports.

5. The device as claimed in claim 4, wherein each of said horizontal supports have a first leg and a second leg,
   said first and second legs being joined at a substantially 90° angle.

6. The device as claimed in claim 5, wherein said intermediate support has means for allowing said intermediate support to be adjustable with respect to said horizontal supports.

7. The device as claimed in claim 4, wherein there are eight horizontal supports which are joined together to form an open box.

8. The device as claimed in claim 7, wherein four of said horizontal supports have connecting means for receiving said intermediate support.

* * * * *